United States Patent

Nishi et al.

[11] Patent Number: 6,148,951
[45] Date of Patent: Nov. 21, 2000

[54] REACTIVE STEERING CONTROL SYSTEM

[75] Inventors: Yutaka Nishi; Yasuharu Oyama; Takashi Nishimori; Kazushige Sugamata; Hiroyuki Kawagoe, all of Wako, Japan

[73] Assignee: Honda Giken Kogyo Kabushiki Kaisha, Tokyo, Japan

[21] Appl. No.: 09/188,719

[22] Filed: Nov. 10, 1998

[30] Foreign Application Priority Data

Nov. 18, 1997 [JP] Japan ................................ 9-317465

[51] Int. Cl.[7] .................................................. B62D 5/04
[52] U.S. Cl. ............................................. 180/446; 701/41
[58] Field of Search .................................. 180/443, 444, 180/446; 701/41

[56] References Cited

U.S. PATENT DOCUMENTS 5,828,972  10/1998  Asanuma et al. ......................... 701/41
5,845,222  12/1998  Yamamoto et al. ....................... 701/41
5,927,430   7/1999  Mukai et al. ............................. 180/446

FOREIGN PATENT DOCUMENTS 50-33584  10/1975  Japan .

Primary Examiner—Anne Marie Boehler
Attorney, Agent, or Firm—Armstrong, Westerman, Hattori, McLeland & Naughton

[57] ABSTRACT

In a steering system which produces a reactive steering assist torque which tends to cancel any unintended or undesired behavior of the vehicle, the control unit for the steering system is prevented from producing any reactive steering assist torque when the vehicle speed is zero so that no reactive steering assist torque may be produced to the discomfort of the vehicle even when the vehicle is being moved by external causes such as when being turned by a turntable or being transported by a car lift or a car carrier.

2 Claims, 8 Drawing Sheets

REACTIVE STEERING CONTROL SYSTEM

TECHNICAL FIELD

The present invention relates to a steering control system for a vehicle equipped with an electric power steering device, and in particular to such a steering control system for a vehicle which is capable of producing a reactive steering torque in response to a detected behavior of the vehicle.

BACKGROUND OF THE INVENTION

Power steering systems for reducing the steering effort required steer the vehicle are known, and one example of such systems is disclosed in Japanese patent publication (kokoku) No. 50-33584. According to this power steering system, the steering torque applied from a steering wheel is assisted by an output torque of an electric motor. By varying the gain for the detected steering torque applied to the steering wheel by the vehicle operator according to the vehicle speed and the road condition, the output torque of the assisting electric motor is adjusted so that an optimum steering assist torque may be obtained at all times.

When the vehicle encounters a strong crosswind or side wind, or runs into ruts or other irregular road surface features, the vehicle tends to deviate from the intended straight path of travel. When the vehicle travels over a low frictional coefficient road surface such as a frozen road surface or the vehicle is traveling at a low speed, the effort required to steer the vehicle significantly diminishes.

According to the conventional power steering system, however, the assisting torque is produced only when the vehicle operator has applied some steering torque to the steering wheel. Therefore, when the vehicle deviates from the intended straight path of travel due to crosswind, the electric motor will not produce any assisting torque by itself. Therefore, to prevent the deviation of the vehicle from the intended path, the vehicle operator must constantly apply a manual steering torque to the steering wheel. According to the conventional steering system, the assisting torque is generally small when the lateral acceleration and the yaw rate of the vehicle are large. Therefore, when the vehicle deviates from an intended path of travel, the steering input necessary to restore the vehicle to the intended path of travel becomes progressively greater as the lateral acceleration and the yaw rate of the vehicle increase.

It was previously proposed to compute a reference behavior of the vehicle in terms of a lateral acceleration and/or a yaw rate for a given steering angle and vehicle speed, detect the actual behavior of the vehicle, and apply a reactive steering torque so as to minimize the deviation of the detected vehicle behavior from the reference vehicle behavior. For details of such control arrangements, reference should be made to U.S. Pat. Nos. 5,528,497, 5,703,775, and 5,774,819 which are assigned to the common assignee, and the contents of these patents are hereby incorporated in this application by reference.

According to such a proposal, it is possible to control the vehicle in a stable fashion even when subjected to various interferences from outside. Also, the handling of the vehicle on a slippery road surface can be improved by preventing excessive steering. However, the sensors for detecting the behavior of the vehicle may produce signals which would cause a reactive steering torque to be produce even when such a reactive steering torque is in fact unnecessary. For instance, when the vehicle is being turned on a turntable or being transported on a lift or the like, this produces a lateral acceleration and/or a yaw rate which would be confused as an indication of vehicle behavior, and the resulting reactive steering torque is not only unnecessary but also causes discomfort to the vehicle operator.

BRIEF SUMMARY OF THE INVENTION

In view of such problems of the prior art, a primary object of the present invention is to provide a steering system which produces a reactive steering torque in response to a vehicle behavior only when such a steering torque is required.

A second object of the present invention is to provide a steering system which would not cause any discomfort to the vehicle operator by preventing an unnecessary steering torque from being produced.

According to the present invention, these and other objects can be accomplished by providing a vehicle steering system, comprising: a steering shaft having a steering wheel at an end thereof; a steering device attached to the other end of the steering shaft, and powered by an electric motor; a manual steering torque sensor for detecting a manual steering torque applied from the steering wheel; a normal steering assist torque determining unit for determining a normal steering assist torque according to a manual steering torque detected by the manual steering torque sensor; a vehicle behavior sensor for detecting a yaw rate and/or a lateral acceleration of the vehicle; a reactive steering assist torque determining unit for determining a reactive steering assist torque according to a yaw rate and/or a lateral acceleration detected by the vehicle behavior sensor; and a control unit for controlling the electric motor according to outputs from the normal steering assist torque determining unit and the reactive steering assist torque determining unit; wherein the vehicle behavior sensor further comprises a vehicle speed sensor for detecting a traveling speed of the vehicle, the control unit disregarding the output from the reactive steering assist torque determining unit when the vehicle speed detected by the vehicle speed sensor is substantially zero. Typically, the control unit controls said electric motor according to a sum of outputs from the normal steering assist torque determining unit and the reactive steering assist torque determining unit.

Thus, the reactive steering assist torque is produced only when the vehicle is moving. Therefore, the generation of unnecessary reactive steering assist torque can be avoided, and it is possible to avoid the discomfort to the vehicle operator due to the generation of such a torque when the vehicle is being moved by a turntable, a lift, a carrier or other external causes.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
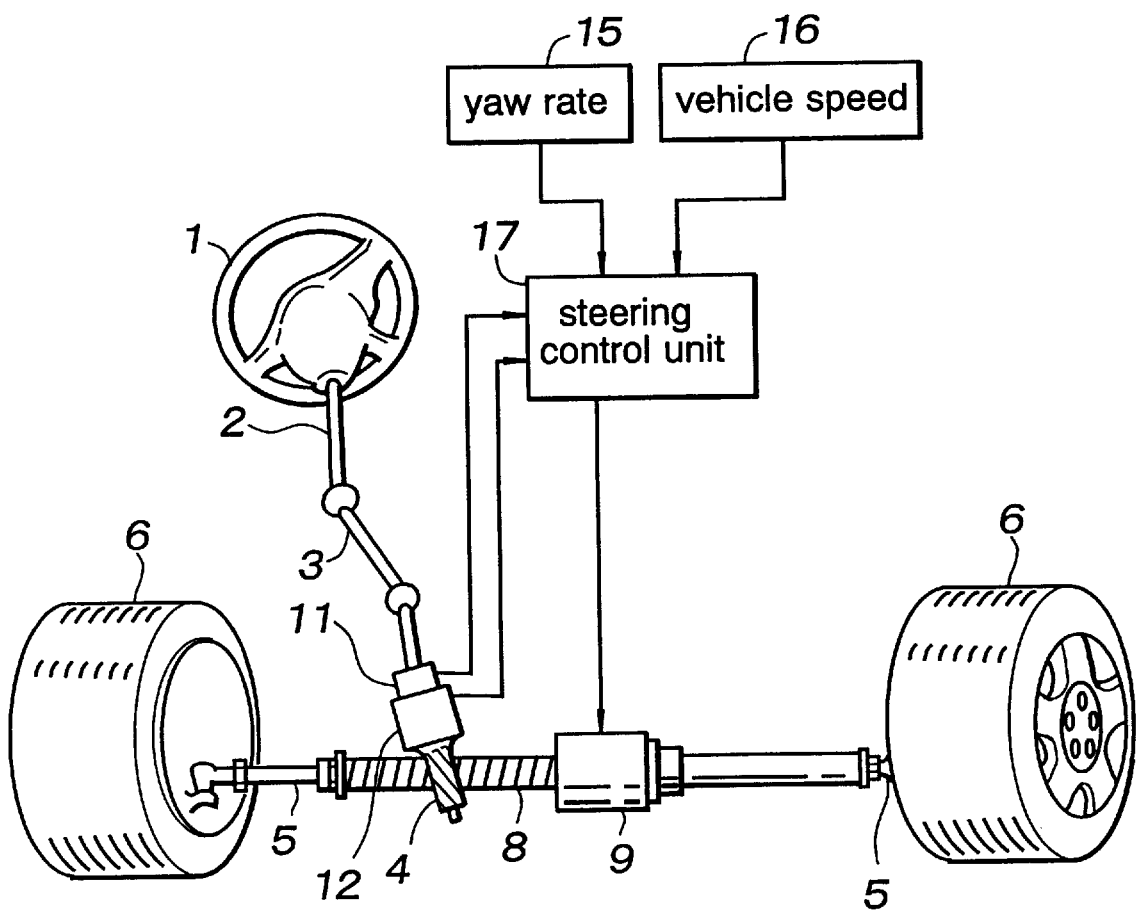
FIG. 1 is a schematic view of the overall structure of the vehicle steering system embodying the present invention.

FIG. 1 schematically illustrates the overall structure of a vehicle steering system embodying the present invention. A steering wheel 1 is integrally attached to an upper end of a steering shaft 2, and a pinion 4 is connected to a lower end of the steering shaft 2 via a connecting shaft 3 incorporated with universal joints. The pinion 4 meshes with a rack shaft 8 which extends laterally across the width of the vehicle body, and connected to knuckle arms of right and left front wheels 6 via tie rods 5 at either end thereof. The structure described so far constitutes a known rack and pinion steering mechanism. An electric motor 9 having a hollow output shaft is coaxially disposed in an intermediate part of the rack shaft 8 so as to apply an assist force to the rack shaft 8 and reduce the effort required to steer the vehicle.

The system further comprises a steering angular speed sensor 11 for detecting the angular speed of the steering wheel 1 at the rack and pinion mechanism, a steering torque sensor 12 for detecting the manual steering torque acting upon the pinion 4, a yaw rate sensor 15 for producing a signal corresponding to the yaw rate (yawing angular speed) of the vehicle, a vehicle speed sensor 16 for producing a signal corresponding to a traveling speed of the vehicle, and a steering control unit 17 for controlling the output of the electric motor 9 according to the outputs of these sensors.

Figure 2:
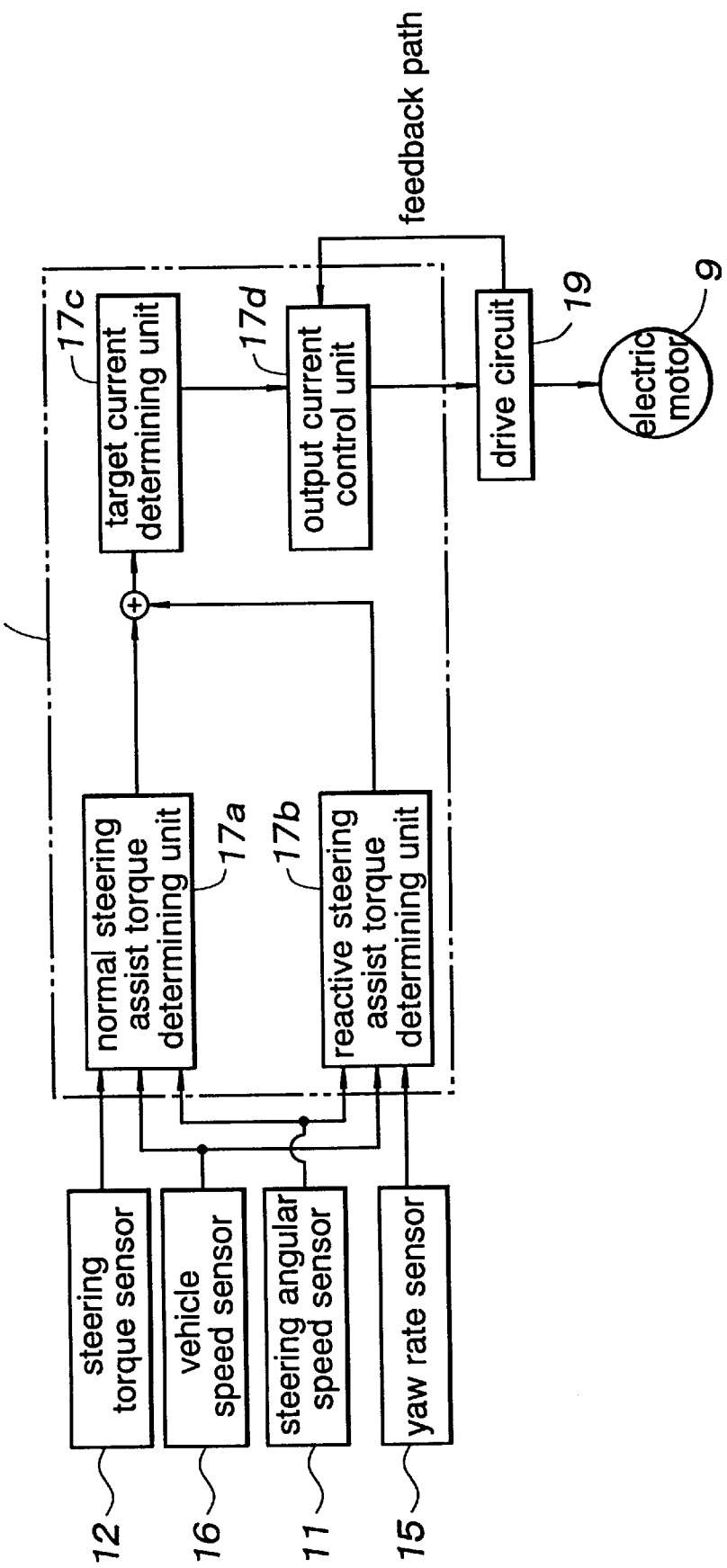
FIG. 2 is a circuit block diagram showing the structure of the control unit of the steering system.

Referring to FIG. 2, the steering control unit 17 comprises a normal steering assist torque determining unit 17a for computing a normal steering assist torque, and a reactive steering assist torque determining unit 17b for computing a reactive steering assist torque which would be desired for controlling the motion of the vehicle, in particular the lateral and yaw motion of the vehicle. The normal steering assist torque determining unit 17a receives output signals from the steering angular speed sensor 11, the steering torque sensor 12, and the vehicle speed sensor 16 as data for conducting normal steering assist torque control. The reactive steering assist torque control unit 17b receives output signals from the steering angular speed sensor 11, the yaw rate sensor 15, and the vehicle speed sensor 16, and compare these values with reference values so as to determine if and how much the behavior of the vehicle deviates from a reference behavior. When any significant deviation is detected, the reactive steering assist torque determining unit 17b supplies a control signal to the electric motor 9 so as to counteract such a deviation by feedback control.

The steering control unit 17 also comprises a target current determining unit 17c for determining a target current for the electric motor 9 according to the torque signals supplied from the normal steering assist torque determining unit 17a and the reactive steering assist torque determining unit 17b, and an output current control unit 17d for controlling the electric current actually supplied to the electric motor 9 according to the thus obtained target current. The current control signal from the output current control unit 17d is supplied to a drive circuit 19, and then to the electric motor 9, and a feedback control path is formed between the drive circuit 19 and the output current control unit 17d.

Figure 3:
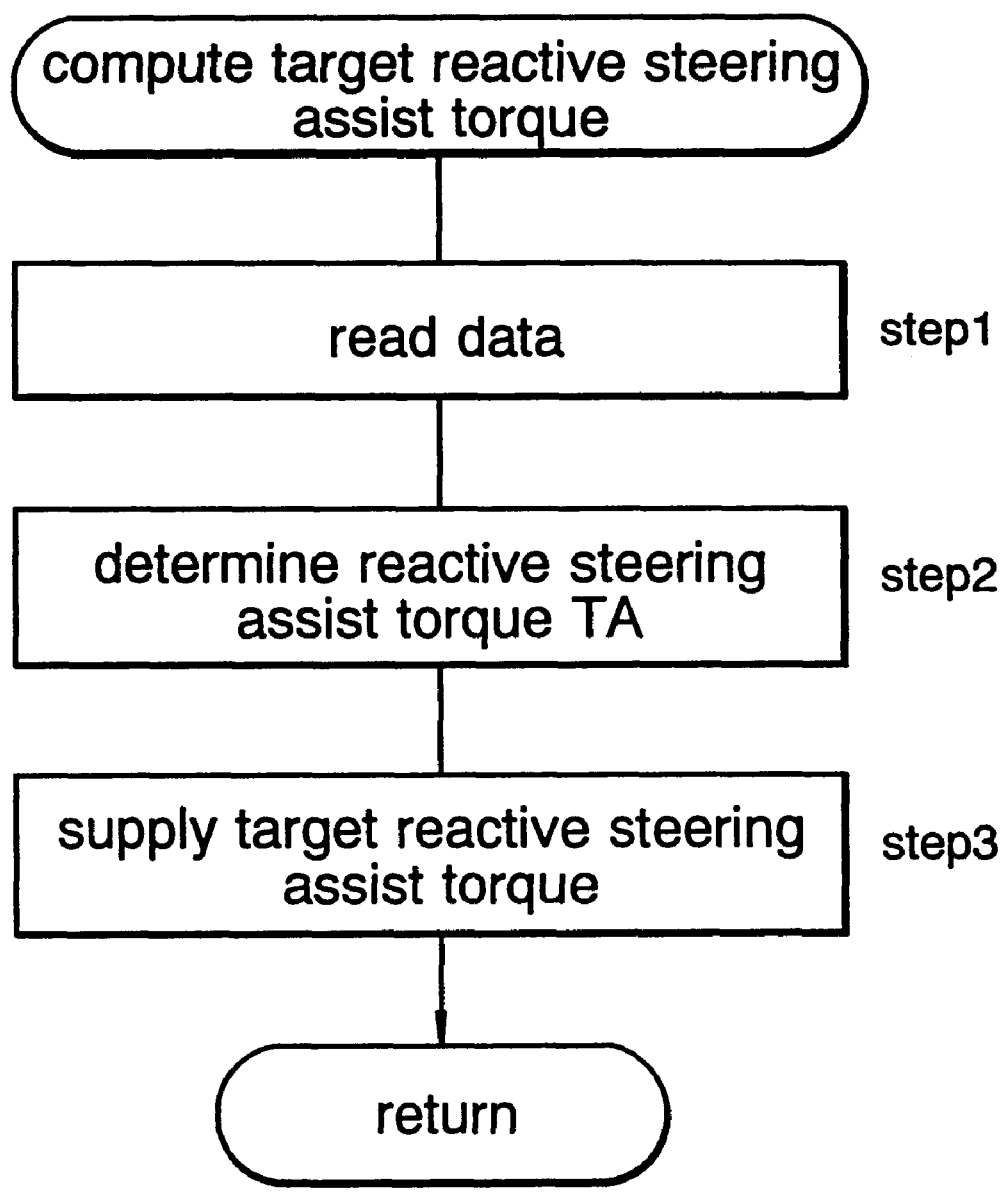
FIG. 3 is a flow chart showing a first part of the control process of the steering system.

In the reactive steering assist torque determining unit 17b of the steering control unit 17, the process shown in the flow chart of FIG. 3 is repeated. First of all, the signals from the various sensors are read in step 1. A reactive steering assist torque TA is computed in step 2. A target reactive steering assist torque TA is produced in step 3. This is more fully described in the following with reference to the flow charts of FIGS. 4 to 7.

Figure 4:
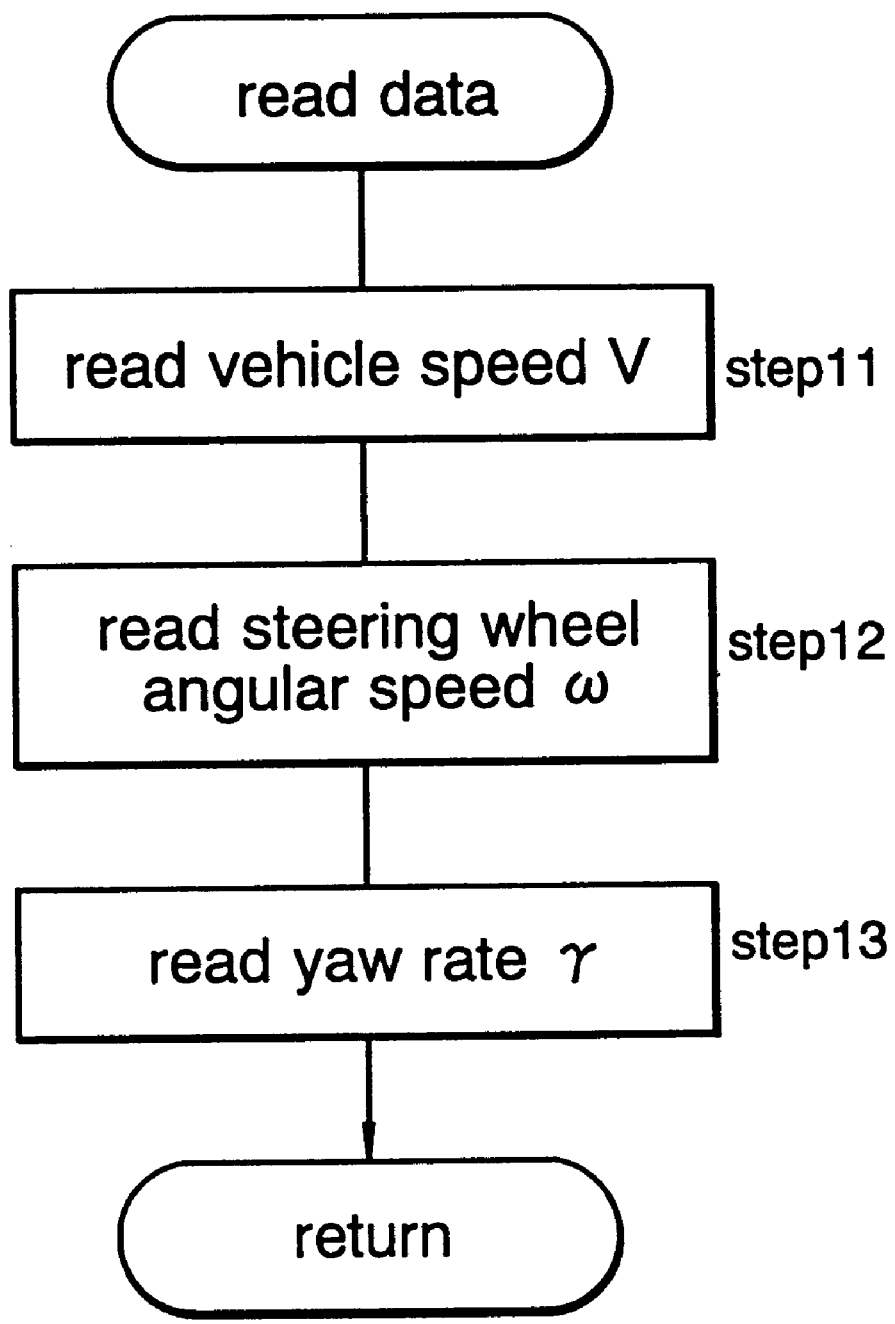
FIG. 4 is a flow chart showing a second part of the control process of the steering system.

Referring to FIG. 4, step 1 is executed in the following manner. The vehicle speed V (step 11), the steering wheel angular speed $\omega$ (step 12), and the yaw rate $\gamma$ (step 13) are read out.

Figure 5:
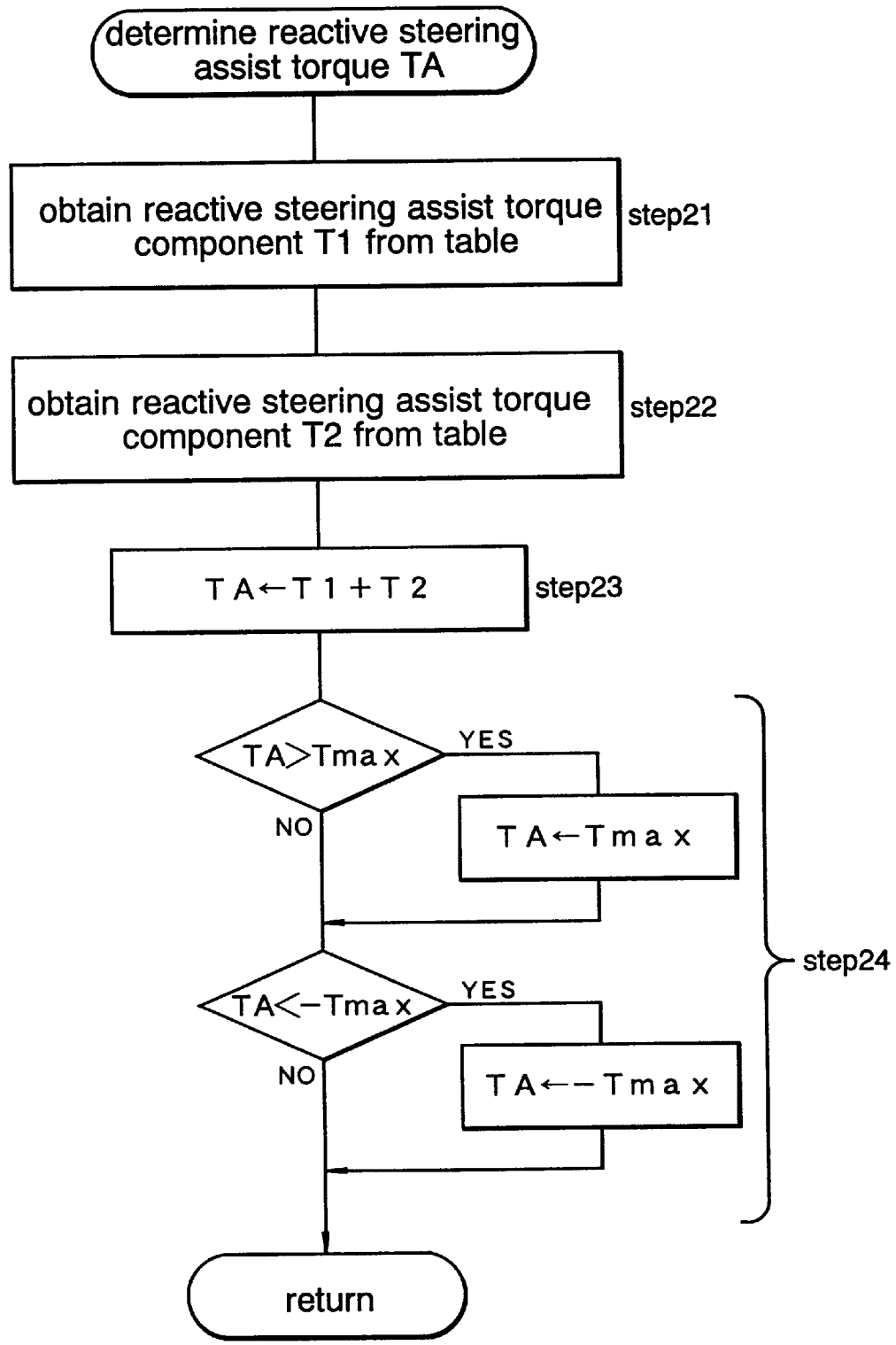
FIG. 5 is a flow chart showing a third part of the control process of the steering system.
Figure 7A:
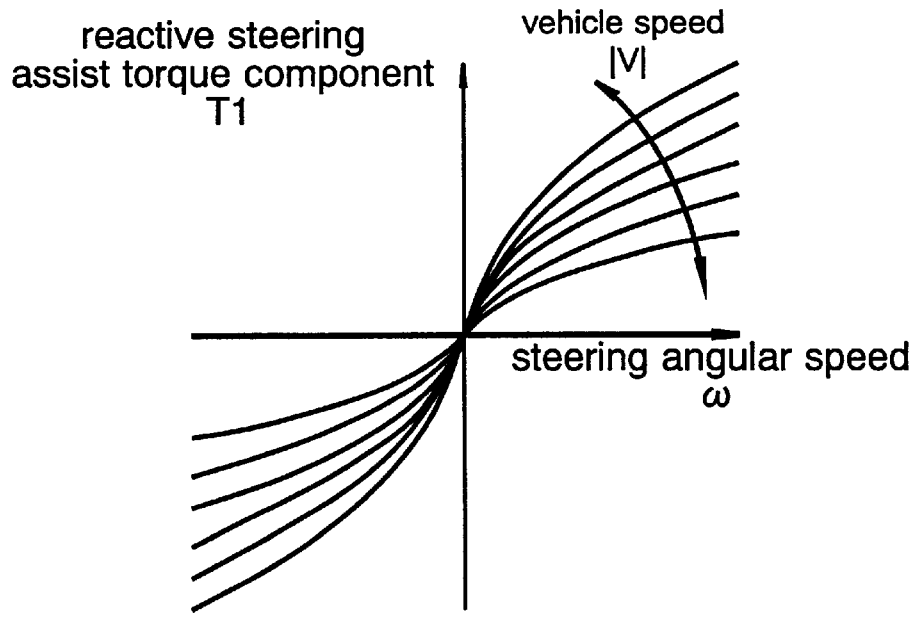
FIGS. 7a and 7b are graphs showing the data table in enlarged scale.
Figure 7B:
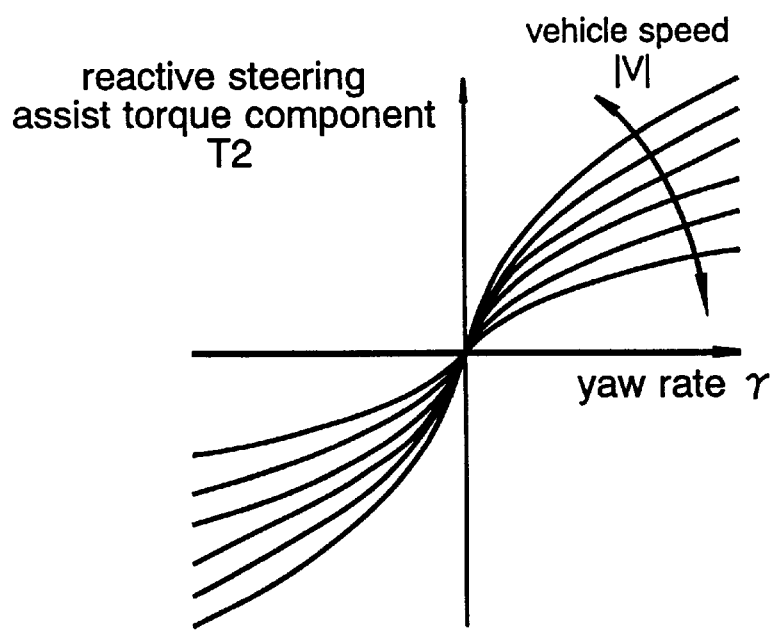

Referring to FIG. 5, step 2 is executed in the following manner. The tables shown in FIGS. 7a and 7b are used for obtaining two components of the reactive steering assist torque, or a damping torque component T1 and a yaw rate torque component T2, in steps 21 and 22. The table shown in FIG. 7a gives the damping torque component T1 for each value of the detected steering angular speed $\omega$. This relationship depends on the vehicle speed V. In this embodiment, a plurality of tables are prepared for a number of different speed ranges, and one of such tables is selected for each given vehicle speed. The table shown in FIG. 7b gives the yaw rate torque component T1 for each value of the detected yaw rate $\gamma$. Again, a plurality of tables are prepared for a number of different speed ranges, and one of such tables is selected for each given vehicle speed. In either case, as the absolute value of the vehicle speed V increases, each of the tables gives a larger reactive steering assist torque component for a given steering angular speed $\omega$ or yaw rate $\gamma$. The two components T1 and T2 are added in step 23.

In particular, the two tables are each formed so as to give a value of zero when the vehicle speed V is zero. Therefore, when the vehicle is stationary, no reactive steering assist torque is produced even when the vehicle is moved by outside causes such as when the vehicle is being turned on a turntable or being transported on a car lift or a car carrier. As for the table relating the yaw rate with the corresponding reactive steering assist torque component T2, when the vehicle is traveling rearward, if desired, it may be possible to produce a reactive steering assist torque component T2 which is opposite in sign from the case when the vehicle is traveling forward or, alternatively, no reactive steering assist torque component T2.

Thereafter, to avoid any excessive reactive steering assist torque from being produced, it is determined if the target reactive steering assist torque TA has exceeded a maximum value (Tmax) or not. If the target reactive steering assist torque TA exceeds the prescribed maximum value (Tmax), the target reactive steering assist torque TA is set at Tmax. If the target reactive steering assist torque TA is less than the prescribed maximum value (Tmax), it is similarly determined if the target reactive steering assist torque TA falls below a prescribed minimum value (−Tmax) or not, and if the target reactive steering assist torque TA is less (larger in the absolute value) than the prescribed minimum value, the target steering reaction TA is set at −Tmax (step 24).

Figure 6:
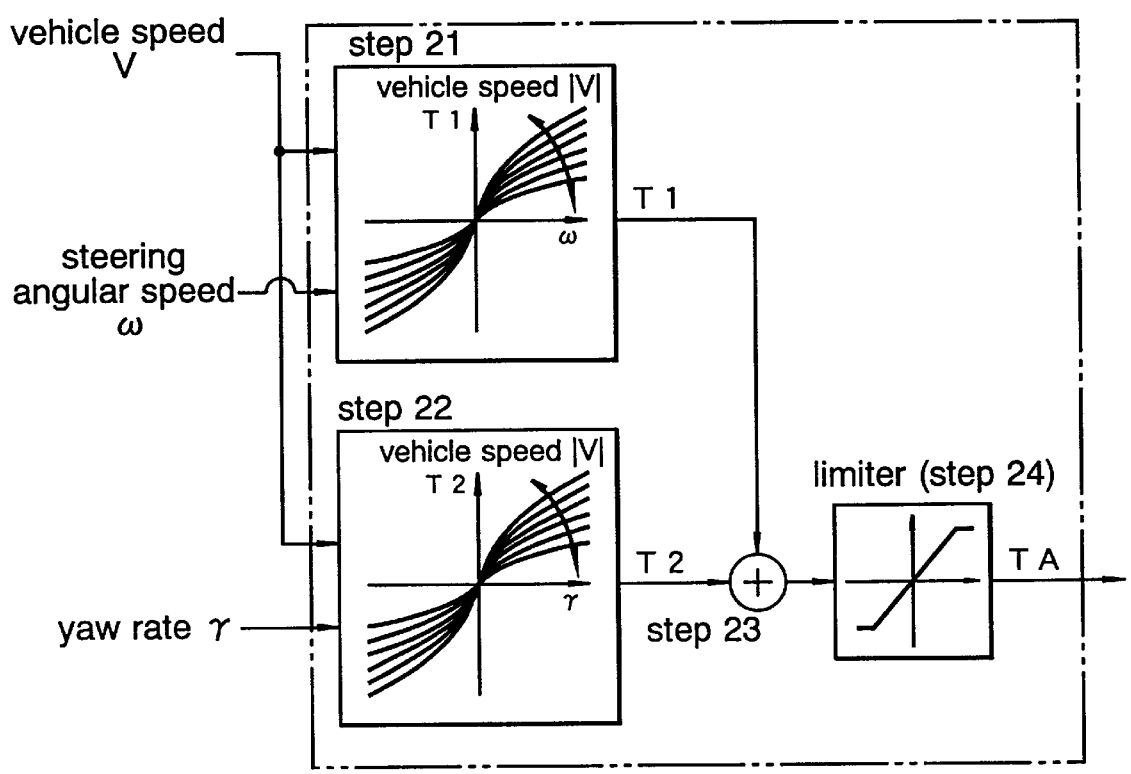
FIG. 6 is a block diagram of the control unit including data tables which are used in the control process for the steering system.

The control arrangement for step 2 can be represented by the block diagram illustrated in FIG. 6, and the blocks in this block diagram correspond to steps 21 to 24

The thus determined target reactive steering assist torque TA is added to the target normal steering assist torque computed separately, and is converted into a target current value by the output current determining unit 17c which is then supplied to the drive circuit 19.

Figure 8:
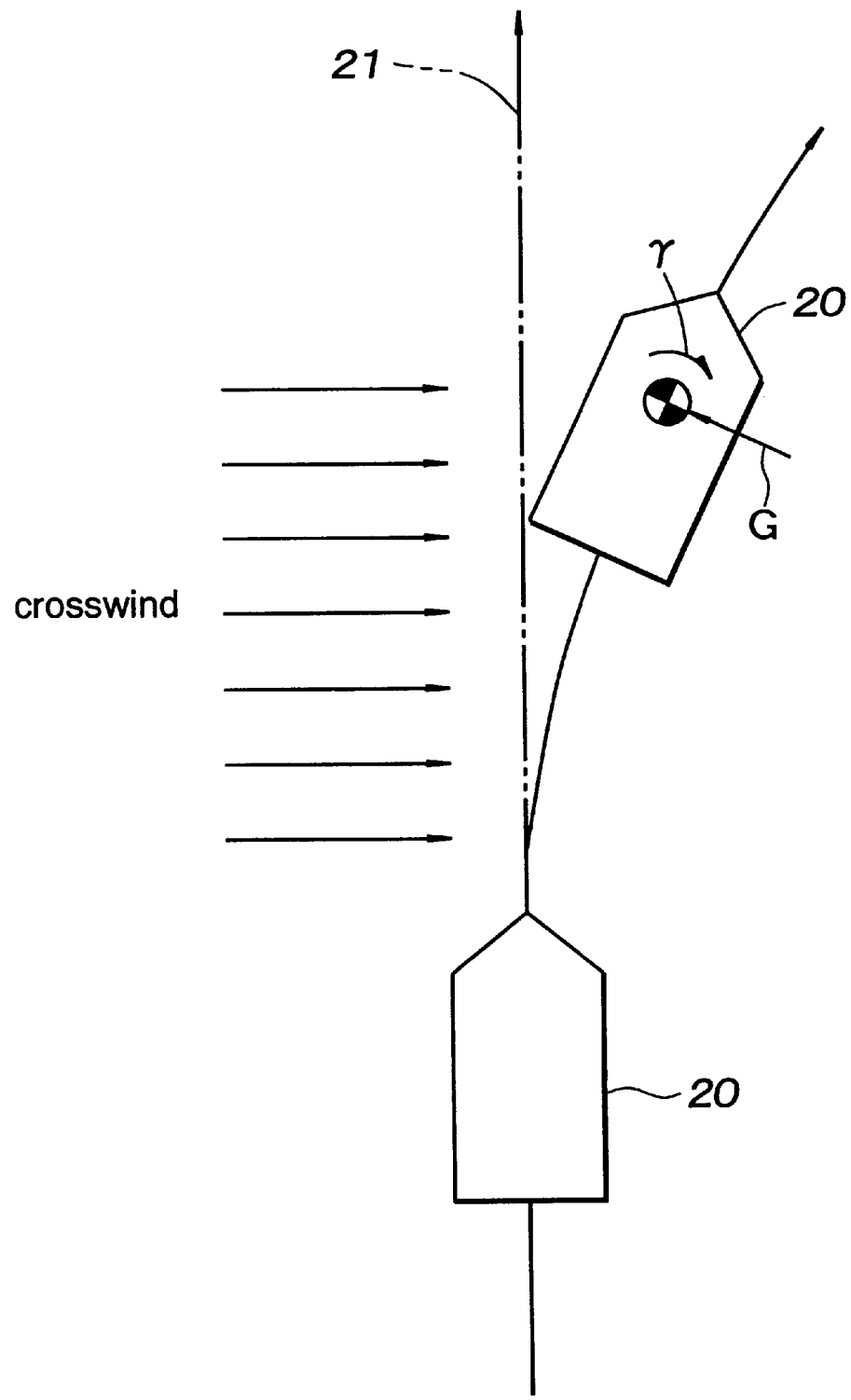
FIG. 8 is a schematic view of a vehicle which has encountered cross wind.

In this manner, as illustrated in FIG. 8, when the vehicle 20 is subjected to crosswind when travelling a straight ahead course, and has started to deviate from a driving lane 21, the yaw rate $\gamma$ of the vehicle is detected, and the electric motor is driven in the direction to cancel the yaw rate γ of the vehicle or to restore the vehicle back to the driving lane 21. Likewise, when the vehicle 20 deviates from a straight path because of other external interferences such as irregular road surfaces, ruts, water pools and so on, the electric motor 9 produces a reactive steering assist torque which tends to cancel such a deviation.

In the above described embodiment, the vehicle behavior was mainly characterized by the yaw rate, but the present invention can be similarly implemented by using the lateral acceleration as a measure of the vehicle behavior. Thus, according to the present invention, the steering system produces a reactive steering assist torque which tends to cancel any unintended or undesired behavior of the vehicle, but is prevented from producing any steering assist torque when the vehicle is moved by external causes such as when being turned by a turntable or being transported by a car lift or a car carrier.

Although the present invention has been described in terms of specific embodiments thereof, it is possible to modify and alter details thereof without departing from the spirit of the present invention.

What is claimed is:

1. A vehicle steering system, comprising:

a steering shaft having a steering wheel at an end thereof;

a steering device attached to the other end of the steering shaft, and powered by an electric motor;

a manual steering torque sensor for detecting a manual steering torque applied from said steering wheel;

a normal steering assist torque determining unit for determining a normal steering assist torque according to a manual steering torque detected by said manual steering torque sensor;

a vehicle behavior sensor for detecting at least one of a yaw rate and a lateral acceleration of the vehicle;

a reactive steering assist torque determining unit for determining a reactive steering assist torque according to said at least one of said yaw rate and said lateral acceleration detected by said vehicle behavior sensors; and a control unit for controlling said electric motor according to outputs from said normal steering assist torque determining unit and said reactive steering assist torque determining unit, wherein said vehicle behavior sensor further comprises a vehicle speed sensor for detecting a traveling speed of the vehicle, said control unit disregarding the output from said reactive steering assist torque determining unit when the vehicle speed detected by said vehicle speed sensor is substantially zero.

2. A vehicle steering system according to claim 1, wherein said control unit controls said electric motor according to a sum of outputs from said normal steering assist torque determining unit and said reactive steering assist torque determining unit.

* * * * *